(12) United States Patent
Chen

(10) Patent No.: US 9,241,200 B2
(45) Date of Patent: Jan. 19, 2016

(54) TARGETED ADVERTISING

(75) Inventor: Ming Chen, Bedford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 56 days.

(21) Appl. No.: 13/270,468

(22) Filed: Oct. 11, 2011

(65) Prior Publication Data
US 2013/0091520 A1 Apr. 11, 2013

(51) Int. Cl.
| | |
|---|---|
| H04N 7/10 | (2006.01) |
| H04N 5/445 | (2011.01) |
| G06F 3/00 | (2006.01) |
| G06F 13/00 | (2006.01) |
| H04N 21/845 | (2011.01) |
| H04N 21/258 | (2011.01) |
| H04N 21/433 | (2011.01) |
| H04N 21/434 | (2011.01) |
| H04N 21/44 | (2011.01) |
| H04N 21/45 | (2011.01) |
| H04N 21/81 | (2011.01) |
| H04N 21/84 | (2011.01) |
| G06Q 30/02 | (2012.01) |

(52) U.S. Cl.
CPC .......... *H04N 21/8456* (2013.01); *G06Q 30/02* (2013.01); *G06Q 30/0241* (2013.01); *G06Q 30/0251* (2013.01); *H04N 21/25891* (2013.01); *H04N 21/4331* (2013.01); *H04N 21/4348* (2013.01); *H04N 21/44016* (2013.01); *H04N 21/4532* (2013.01); *H04N 21/812* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 7,810,114 | B2 * | 10/2010 | Flickinger et al. | 725/32 |
| 8,275,663 | B2 * | 9/2012 | Rochford et al. | 705/14.67 |
| 2002/0144263 | A1 * | 10/2002 | Eldering et al. | 725/34 |
| 2004/0140989 | A1 * | 7/2004 | Papageorge | 345/700 |
| 2004/0158858 | A1 * | 8/2004 | Paxton et al. | 725/42 |
| 2005/0027742 | A1 * | 2/2005 | Eichstaedt et al. | 707/104.1 |
| 2005/0235318 | A1 * | 10/2005 | Grauch et al. | 725/46 |
| 2006/0282328 | A1 * | 12/2006 | Gerace et al. | 705/14 |
| 2009/0217316 | A1 * | 8/2009 | Gupta | 725/32 |

\* cited by examiner

*Primary Examiner* — Nasser Goodarzi
*Assistant Examiner* — Adil Ocak

(57) ABSTRACT

A distribution system of programs and ads includes transmitting one or more ad channels to user devices. An ad channel includes ads and ratings that indicate a likelihood of interest of a user for an ad. The ratings are calculated based on ad profiles and user profiles. A user device selects ads to play during an ad insertion period of a program based on the rating.

22 Claims, 11 Drawing Sheets

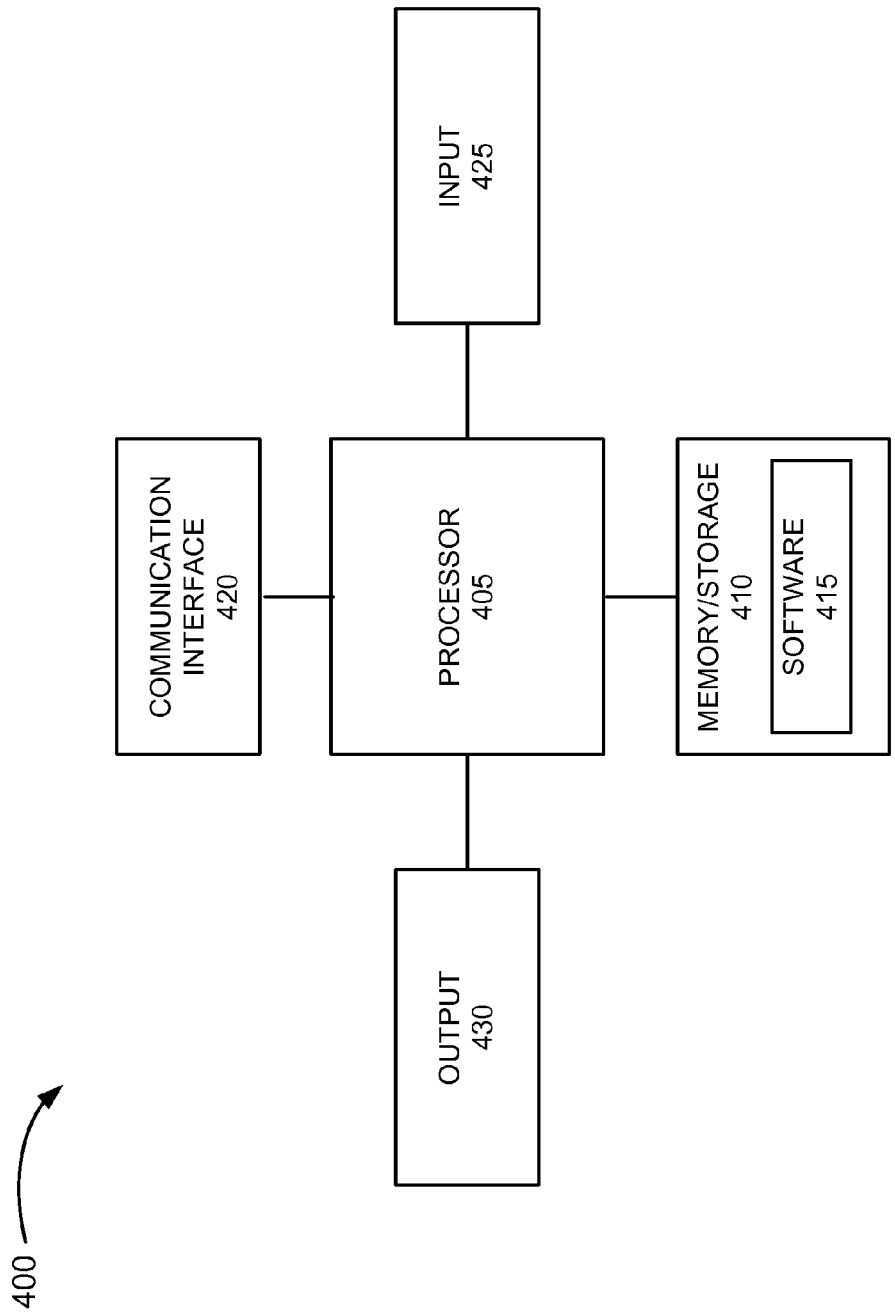

TARGETED ADVERTISING

BACKGROUND

A distribution system, such as a distribution system for television programming, provides an expansive array of programs, such as movies, local programs, national programs, sports, news, etc., to users. Additionally, the distribution system provides users with a variety of advertisements (ads) (e.g., commercials, etc.).

BRIEF DESCRIPTION OF THE DRAWINGS

FIG. 4 is a diagram illustrating exemplary components of a device that may correspond to a device previously described;

DETAILED DESCRIPTION OF PREFERRED EMBODIMENTS

Figure 1:
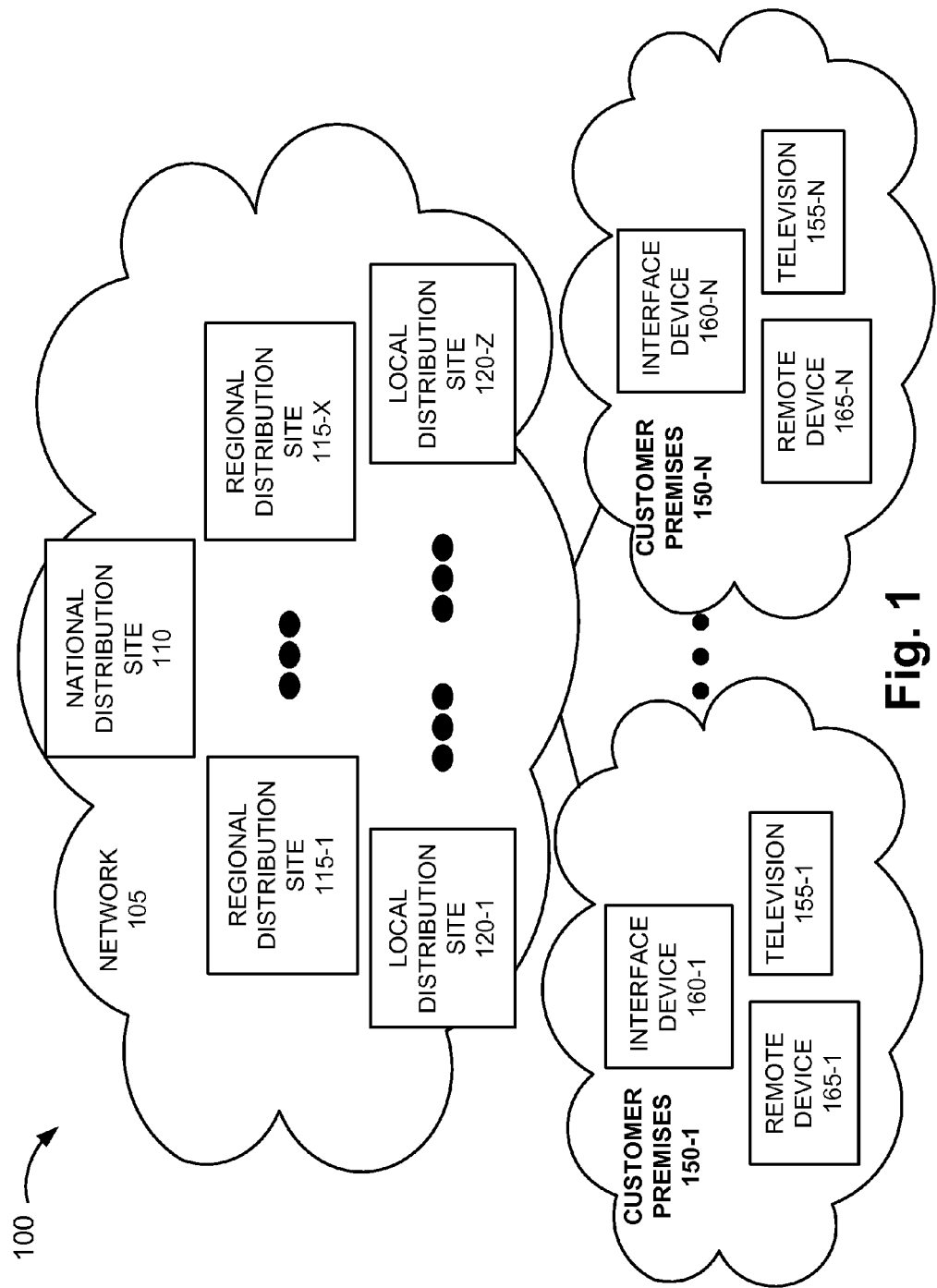
FIG. 1 is a diagram illustrating an exemplary environment in which an exemplary embodiment of targeted advertising may be implemented.

The following detailed description refers to the accompanying drawings. The same reference numbers in different drawings may identify the same or similar elements. Also, the following detailed description does not limit the invention.

The term "program" includes video and/or audio content. A program may include, for example, a local program, a national program, a television show, a movie, a sporting event, a news program, a musical event, or an audio program (e.g., a program that plays music).

The term "ad" includes video and/or audio content. An ad may include, for example, a commercial, an audio voiceover, or a promotion for a program.

According to an exemplary embodiment, a distribution system uses a multichannel framework for delivering programs and ads. For example, the distribution system uses program channels and ad channels. According to an exemplary embodiment, an ad channel includes a series of ads (e.g., one ad after another ad, etc.). In this way, the resource (e.g., bandwidth) of the ad channel is efficiently used. This is in contrast to other approaches in which an ad channel includes an ad at a particular time slot (e.g., an ad insertion time slot relative to a program), but before the ad and after the ad (e.g., during the program or non-advertisement period), the ad channel includes dead content (e.g., blank video and muted audio).

According to an exemplary embodiment, in addition to ads, an ad channel includes a rating for each ad. According to an exemplary embodiment, the rating represents a likelihood of interest of a user for an ad. According to an exemplary implementation, the rating is implemented as a numerical score. According to other implementations, the rating is represented according to some other nomenclature (e.g., symbols, alphabetic, a string, etc.). According to an exemplary embodiment, the rating is based on a profile pertaining to the ad and a profile pertaining to the user of a receiving device.

According to an exemplary embodiment, a receiving device that receives the ad channel selects an ad having a highest rating relative to other ratings associated with other ads. The selected ad is played during an ad slot within a program of a program signal (e.g., a program channel).

According to an exemplary embodiment, the receiving device pre-stores ads. For example, the receiving device may be powered on even when the receiving device is not in use by a user. During this time, the receiving device receives an ad channel and stores ads. The receiving device selects an ad to play during an ad slot when the receiving device is in use by the user. In this way, the receiving device is not limited to a selection of ads provided when the receiving device is in use by the user.

According to an exemplary embodiment, the receiving device receives multiple ad channels. According to an exemplary embodiment, ads may be classified into categories and sub-categories. Ad categorization and ad sub-categorization may be used to select ads for a user.

According to an exemplary embodiment, a filtering system is used to filter ads for purposes of targeting ads to a user(s). According to an exemplary implementation, filtering is performed by a distribution device of the distribution system and the receiving device. For example, the distribution device filters irrelevant ads (e.g., ads deemed not of interest to the user), while relevant ads are transmitted over the ad channel. The ads received by the receiving device are further filtered. By way of example, assume the distribution system filters ads that are not of interest to a particular household residence (e.g., a father, a mother, and two teenage daughters). In this way, the ads transmitted target the members of the household. Upon receipt, receiving device(s) further filter the ads according to individual members or combinations thereof. For example, the receiving device may filter ads based on user profiles, viewing history, and location of receiving device in the residence. As described further below, various factors may be used to filter ads. Further, the factors applied for filtering the ads by the distribution device does not necessarily have to be the same as the factors used by the receiving device.

FIG. 1 is a diagram illustrating an exemplary environment in which an exemplary embodiment of targeted advertising may be implemented. As illustrated in FIG. 1, environment 100 includes network 105 and customer premises 150-1 through 150-N (referred to generally as customer premises 150). Network 105 includes a national distribution site 110, regional distribution sites 115-1 through 115-X (referred to generally as regional distribution sites 115 or regional distribution site 115), and local distribution sites 120-1 through 120-Z (referred to generally as local distribution sites 120 or local distribution site 120). Customer premises 150 includes televisions (TVs) 155-1 through 155-N (referred to generally as televisions 155 or television 155), interface devices 160-1 through 160-N (referred to generally as interface devices 160 or interface device 160), and remote devices 165-1 through 165-N (referred to generally as remote devices 165 or remote device 165).

The number of devices, the number of networks, and the configuration in environment 100 are exemplary and provided for simplicity. According to other embodiments, environment 100 may include additional devices, fewer devices, different devices, and/or differently arranged devices, than those illustrated in FIG. 1. Additionally, or alternatively, environment 100 may include additional networks and/or differently arranged networks than those illustrated in FIG. 1. For example, environment 100 may include other types of network(s), such as a network provider network, a content provider network, the Internet, etc. Additionally, or alternatively, for example, customer premises 150 may include a local area network (LAN), a wireless router, etc.

According to an embodiment, a single device in FIG. 1 may be implemented as multiple devices and/or multiple devices may be implemented as a single device. According to an embodiment, a device may be implemented according to a centralized computing architecture or a distributed computing architecture. Additionally, according to an embodiment, a device may be implemented according to one or multiple network architectures (e.g., a client device, a server device, a peer device, or a combination thereof).

Also, according to an embodiment, one or more functions and/or processes described as being performed by a particular device may be performed by a different device, or some combination of devices. Environment 100 may be implemented to include wired and/or wireless connections among the devices illustrated.

Network 105 includes one or multiple networks that distributes or makes available programs and ads. Network 105 may be implemented as a satellite-based network and/or a terrestrial-based network. According to an exemplary embodiment, network 105 may be implemented as a television distribution network. According to other embodiments, network 105 may be implemented as a mobile network, an Internet access network, and/or other suitable network(s).

National distribution site 110 includes devices to distribute programs and ads to a national area. Regional distribution site 115 includes devices to distribute programs and ads to a regional area. Local distribution site 120 includes devices to distribute programs and ads to a local area. According to an exemplary embodiment, national distribution site 110 may be implemented as a super headend. According to an exemplary embodiment, regional distribution site 115 may be implemented as a video hub office. According to an exemplary embodiment, local distribution site 120 may be implemented as a video switching office. According to other embodiments, national distribution site 110, regional distribution site 115, and/or location distribution site 120 may be implemented as other types of infrastructures that provide, for example, program and ad acquisition (e.g., a content center), program and ad processing, and program and ad delivery. National distribution site 110, regional distribution site 115, and/or local distribution site 120 may include various devices, such as, for example, media servers, search servers, load balancers, databases, and transport devices (e.g., routers, switches, etc.).

Each customer premises 150 includes a location where a customer receives service from network 105. For example, the customer may receive service at home, at work, or at locations where the customer is mobile. Each customer premises 150 includes one or multiple devices that allow the user to receive programs and ads. For example, in a home setting, customer premises 150 may include television 155, interface device 160, and remote device 165. Additionally, according to other embodiments, customer premises 150 may include various devices to allow the user to receive programs via Internet service and/or mobile service, as described herein. According to another example, in a mobile setting, customer premises 150 may include a mobile device (e.g., a smartphone, a tablet device, a laptop computer, etc.). Alternatively, the user may use a vehicular communication system. According to yet another example, in a work setting, customer premises 150 may include a desktop computer or some other suitable user device.

Television 155 includes a device to display programs and ads. According to an exemplary embodiment, television 155 may correspond to a television. According to other embodiments, television 155 may be implemented as other types of display devices, such as, for example, a monitor, a mobile device having a display, etc. According to an exemplary embodiment, television 155 and interface device 160 may be separate devices, as illustrated in FIG. 1. According to other embodiments, television 155 may include interface device 160 or include some of the functionalities provided by interface device 160.

Interface device 160 includes a device that communicates with network 105 to provide programs and ads. According to an exemplary embodiment, interface device 160 may be implemented as a set top box. The set top box may include a client device, a thin client device, a set-top box, a converter box, a receiver device, a server device, a peer device, a tuner device, and/or a digibox. According to an exemplary embodiment, interface device 160 includes a digital video recorder (DVR) and/or a hard drive. According to an exemplary embodiment, interface device 160 provides multi-room television services.

Remote device 165 includes a device that communicates with television 155 and/or interface device 160 to allow a user to interact with interface device 160 and/or television 155. Remote device 165 may include one or multiple input mechanisms (e.g., buttons, a display, a touchpad, a touchscreen, a microphone, etc.) to receive a user's input and, among other things, allow the user to interact with interface device 160. According to an exemplary embodiment, remote device 165 may correspond to a remote control device (e.g., a set-top box controller, a television controller, a converter box controller, etc.).

According to other embodiments, remote device 165 may correspond to other types of devices. For example, remote device 165 may be implemented as a tablet device, a mobile communication device, a personal digital assistant (PDA), a handheld device, a smartphone, or some other type of user device. According to still other embodiments, remote device 165 may include television 155. According to yet other embodiments, remote device 165 may include television 155 and interface device 160 or include some of the functionalities associated with interface device 160.

Figure 2:
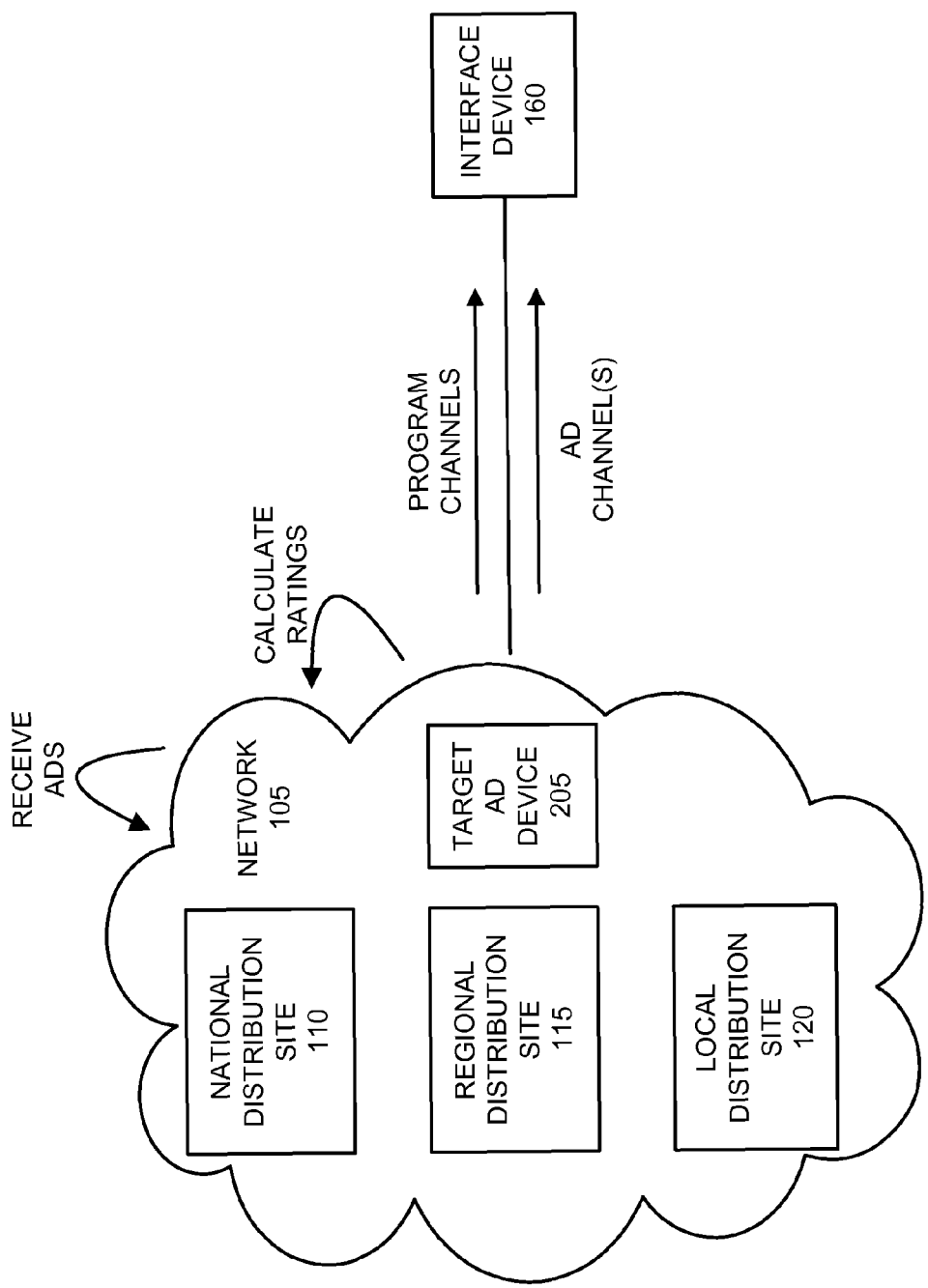
FIG. 2 is a diagram illustrating an exemplary process for calculating ratings for ads.

As previously described, according to an exemplary embodiment, a distribution system delivers programs and ads using program channels and one or multiple ad channels to a receiving device, such as television device 155, interface device 160, and/or remote device 165. Referring to FIG. 2, according to an exemplary process, at least one of national distribution site 110, regional distribution site 115, or local distribution site 120 receives ads from various sources, such as, ad providers (not illustrated). At least one of distribution sites 110, 115, or 120 calculates ratings for the ads. As previously described, the ratings may be calculated based on profiles pertaining to the ads and profiles pertaining to the user(s).

According to an exemplary embodiment, an ad profile includes a category of the ad. The ad profile may also include a sub-category. By way of example, ads may be categorized based on whether the ads pertain to vehicles, food, services (e.g., legal, medical, insurance, communication, etc.), cosmetics, pharmaceutical drugs, education (e.g., schools, universities, etc.), stores, etc. Categories may include sub-categories. For example, the vehicle category may be sub-categorized based on the type of vehicle being advertised (e.g., sports, family, hybrid, etc.), manufacturer, price (e.g., high, medium, low), etc. As another example, the food category may be sub-categorized based on the type of food (e.g., fast-food, healthy, diet, etc.), the source of the food (e.g., fast-food chains, restaurants, etc.), etc. According to an exemplary embodiment, ads may be categorized and/or sub-categorized based on other characteristics pertaining to the ads, such as, humorous, serious, normal, sexual, fear-driven, new, old, etc.

According to an exemplary implementation, the ad profile includes a locale descriptor. For example, the locale descriptor indicates a geographic area applicable to the ad. For example, some ads are limited to an audience of a particular geographic area, such as ads pertaining to local businesses or local services. While other ads, for example, may be national or regional in nature. The locale descriptor may be implemented as a zip code(s), a name of state(s), a national descriptor, or other suitable geographical indicator.

According to an exemplary implementation, the ad profile includes a popularity index. For example, the popularity index indicates a degree of popularity pertaining to the thing being advertised within a geographical area associated with the locale descriptor. According to an exemplary implementation, the degree of popularity may be measured based on market share, brand recognition, etc. By way of example, an ad for McDonalds® may be afforded a greater popularity index than an ad for Wendy's®.

According to an exemplary embodiment, the user profile includes user data. User data includes demographic data, viewership data, and location data. Demographic data includes demographics pertaining to a user. For example, if customer premises 150 is a user's residence, demographic data may include the age and gender of a user. Demographic data may include relationships between users (e.g., mother, father, daughter, son, etc.) or between an account holder and other users. Demographic data may also include other types of data, such as, financial data. Viewership data includes data pertaining to programs viewed by a user. For example, viewership data may identify programs viewed, favorite channels, special packages purchased (e.g., a sports package, a pay-per-view program, an on-demand program, etc.). Location data includes data pertaining to a location of the user. For example, location data may include address information (e.g., street address, city, state, zip code, etc.). User data may include other types of information. For example, user data may include user equipment information that indicates the type of user device(s) used by a user (e.g., mobile phone, television, etc.), their location (e.g., set top box in family room, in teen daughter's bedroom, etc.) in customer premises 150, and/or an equipment identifier of a user device (e.g., a receiving device).

Referring to FIG. 2, at least one of distribution sites 110, 115, or 120 calculates ratings for the ads based on the ad profiles and the user profiles. For example, a target ad device 205 applies a set of rules to ad profiles and user profiles to assign ratings to ads. Target ad device 205 or some other device of distribution sites 110, 115, or 120 selects ads to be transmitted over an ad channel based on the ratings and the user. For example, network 105 may identify a user based on the equipment identifier associated with the receiving device (e.g., interface device 160). Additionally, or alternatively, network 105 may identify the user based on other information, such as, for example, the program currently being displayed to the user based on favorites channel information, the time of day, etc. Network 105 generates one or multiple ad channels based on the calculated ratings associated with the ads. As further illustrated in FIG. 2, program channels and ad channel(s) are provided to interface device 160.

Figure 3A:
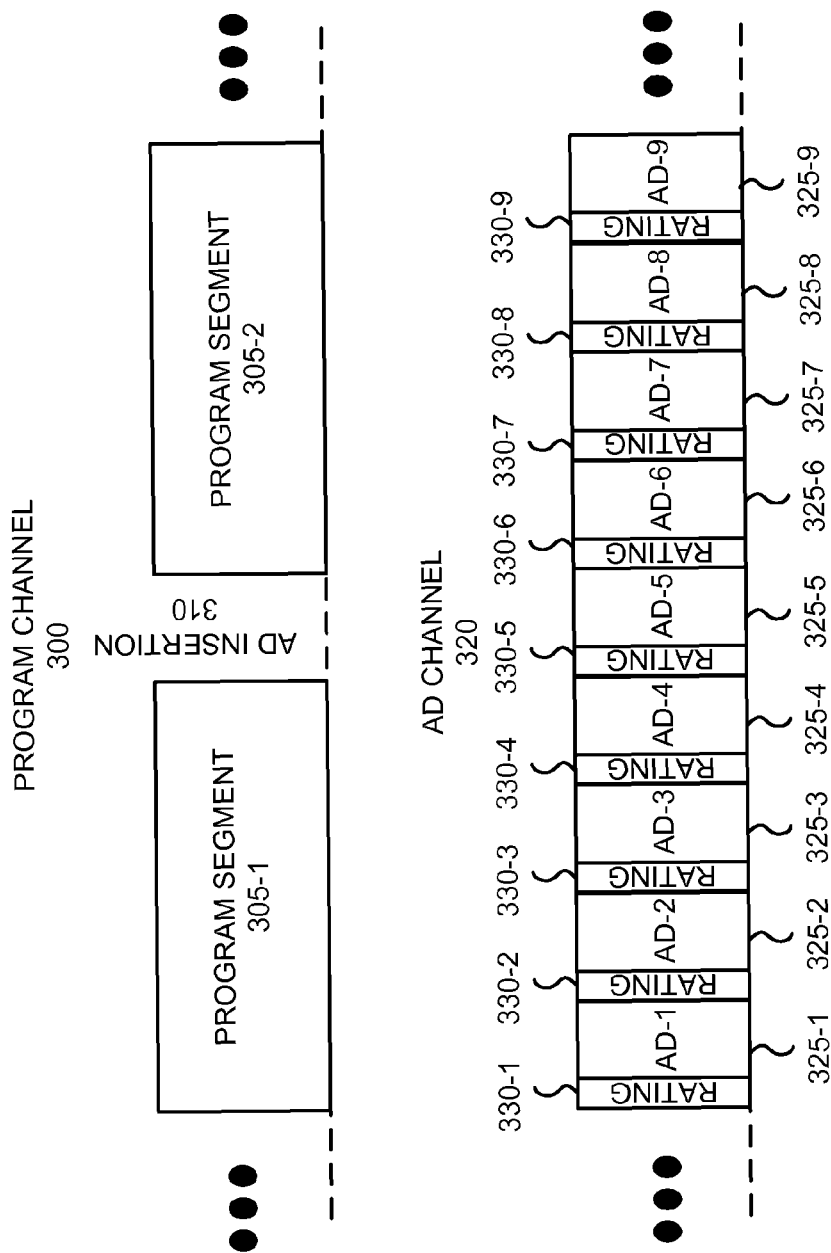
FIG. 3A is a diagram illustrating an exemplary program channel and an exemplary ad channel.

FIG. 3A illustrates an exemplary program channel 300 and an exemplary ad channel 320. Program channel 300 includes a series of program segments 305 (e.g., program segment 305-1 and program segment 305-2) pertaining to a program. Additionally, program channel 300 includes an ad insertion portion 310 that provides a time period for one or more ads to be provided to a user. Ad channel 320 includes a series of ads 325 (e.g., ads 325-1 through 325-9). Additionally, ad channel 320 includes ratings 330 (e.g., 330-1 through 330-9) pertaining to ads 325.

Figure 3B:
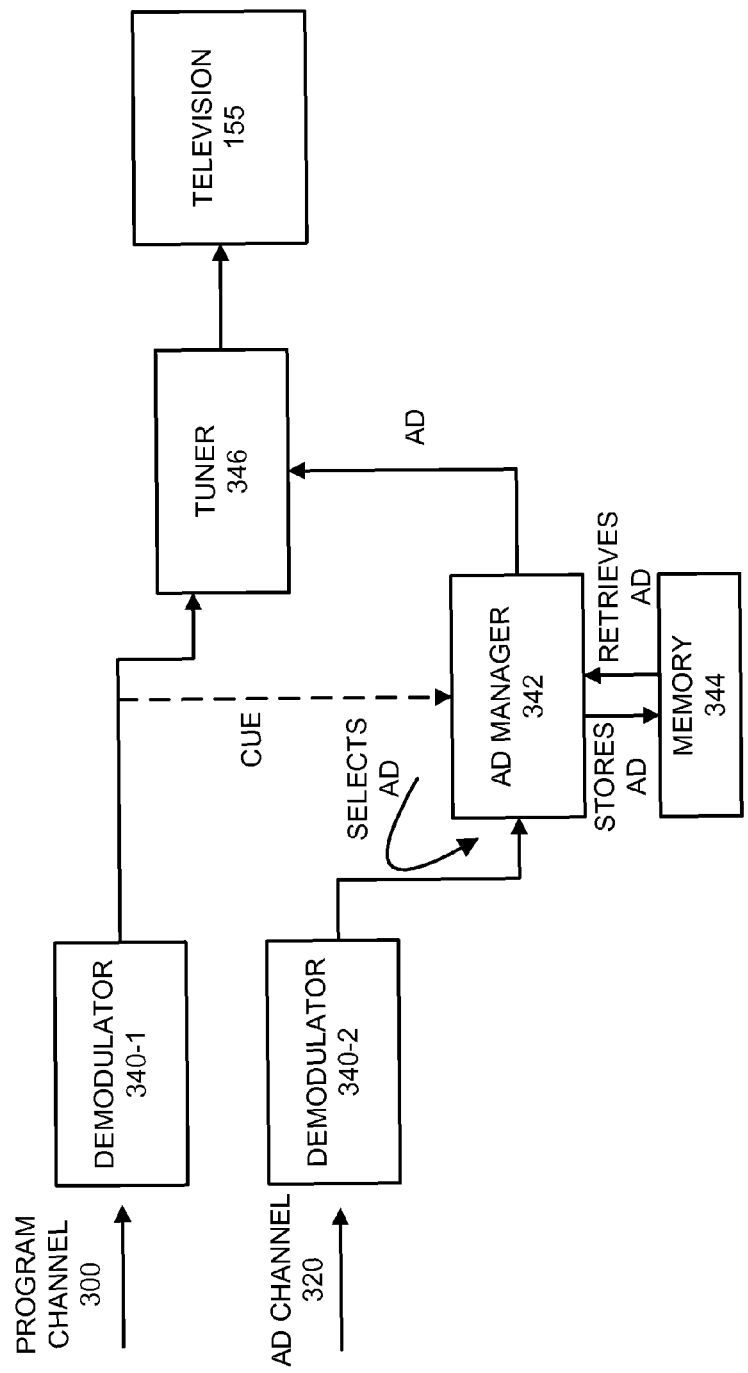
FIG. 3B is a diagram illustrating an exemplary process for selecting and providing ads to users based on ratings associated with the ads.

FIG. 3B illustrates an exemplary process for selecting and providing ads to users based on their ratings. According to this example, it may be assumed that program channel 300 and ad channel 320 are modulated signals (e.g., Quadrature Amplitude Modulation (QAM), etc.). According to an exemplary embodiment, interface device 160 (e.g., a set top box, etc.) includes demodulators 340-1 and 340-2. As illustrated, demodulator 340-1 receives program channel 300 and demodulator 340-2 receives ad channel 320 to permit interface device 160 to simultaneously demodulate each signal. According to an exemplary implementation, demodulators 340 may demodulate program channel 300 and ad channel 320 at different frequencies. Interface device 160 also includes an ad manager 342, memory 344, and a tuner 346. Ad manager 342 receives the demodulated ad channel and identifies ratings 330 associated with ads 325. Ad manager 342 selects one or more ads 325 that have higher ratings than other ads 325 and stores the ad(s) 325 in memory 344.f As further illustrated, ad manager 342 detects a cue in program channel 300. According to an exemplary implementation, the cue is an audio tone (e.g., a cue tone) that indicates to ad manager 342 that an ad is to be played. According to other implementations, the cue may be video signal or a combination of an audio and video signal. In response to the cue, ad manager 342 selects a stored ad 325 from memory 344. The stored ad 325 has a highest rating 330 indicative of likelihood of interest to the user. Tuner 346 plays the ad 325, which is displayed by television 155.

According to other embodiments, ad manager 342 selects one or more stored ads 325 based on other factors. For example, some ads 325 may be different in length (e.g., time-wise) than other ads 325. Thus, depending on the duration of ad insertion 310 and the duration of each stored ads 325, ad manager 342 selects ads 325 based on the duration of the ad insertion 310. As an example, assume that memory 344 stores a first ad 325 with a rating 330 of "98" and a duration of 1 minute, a second ad 325 with a rating 330 of "93" and a duration of 1.5 minutes, and a third ad 325 with a rating 330 of "95" and a duration of 0.5 minutes. Also, assume that the duration of the ad insertion 310 is 2 minutes. In this example, although the first ad 325 has a higher rating than the second and third ads 325, the duration of the first ad 325 does not allow ad manager 325 to select it. In this case, ad manager 342 selects the second and the third ads 325 to fill the 2 minutes needed for the ad insertion 310.

According to an exemplary embodiment, ad manager 342 may track how much of ad 325 is viewed by the user. That is, ad manager 342 may identify whether, for example, the user watched the entire ad 325, changed the channel during the playing of ad 325, turned off the receiving device (e.g., interface device 160, etc.), etc. Based on the user's actions, ad manager 342 may assign a reinforcement value to the rating 330. For example, if the user views the entire ad 325, the reinforcement value may be positive in that the assigned rating 330 accurately reflects the user's likelihood of interest. Alternatively, for example, if the user switches the channel for a couple of minutes (e.g., to skip watching ad 325) and then returns to the program, the reinforcement value may be negative in that the assigned rating 330 does not accurately reflect the user's likelihood of interest. The reinforcement value may be transmitted back to network 105 (e.g., target ad device 205). Target ad device 205 may use the reinforcement value to re-evaluate the assigned rating 330 of the particular ad 325. For example, the rating 330 may be increased or improved when the reinforcement value is positive or the rating 330 may be decreased or degraded when the reinforcement value is negative. In this way, ratings 330 may not be static, but dynamic.

Referring back to FIG. 2, according to an exemplary embodiment, interface device 160 may receive an ad channel when interface device 160 is not in use by a user. For example, it is not uncommon for a user to turn off television 155 but leave interface device 160 turned on and connected to network 105. During this period of time, interface device 160 receives and stores ads. According to such an embodiment, interface device 160 includes a hard drive or other storage device for storing a number of ads. For example, interface device 160 may have a hard drive with sufficient space to store 100s or 1000s of ads.

As previously described, according to an exemplary embodiment, multiple ad channels may be received by interface device 160. According to an exemplary implementation, interface device 160 may include multiple demodulators 340. According to other exemplary implementations, interface device 160 may include a single demodulator 340.

Figure 3C:
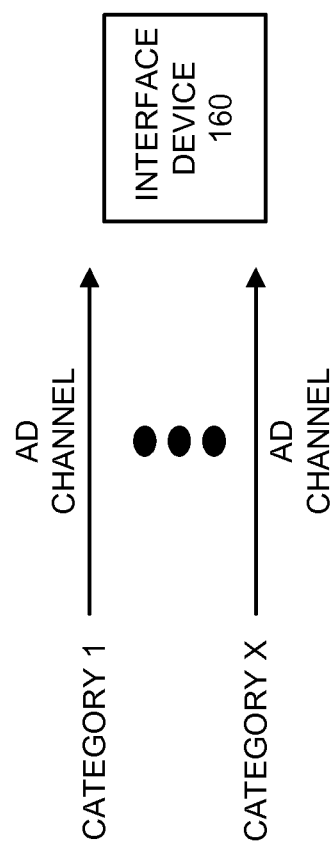
FIG. 3C is a diagram illustrating interface device receiving multiple ad channels.

FIG. 3C is a diagram illustrating interface device 160 receiving multiple ad channels. According to an exemplary implementation, interface device 160 may select which ad channel to monitor. For example, interface device 160 may select a default ad channel when it is unknown what user is using interface device 160. Interface device 160 may select another ad channel once the user is known (e.g., based on the program viewed, selection of favorite channel, etc.). In some cases, the user may be known simply based on the location of interface device 160. For example, assume that interface device 160 is a set top box located in a bedroom of a user. In this example, the user may be readily identified (e.g., based on an equipment identifier associated with interface device 160 mapped to a location). According to another example, assume that interface device 160 is a set top box located in a family room. In this example, the user may not be readily identified since multiple users may use interface device 160. According to other implementations, interface device 160 may simultaneously monitor multiple ad channels in which ad(s) are selected and stored based on their ratings, etc.

According to an exemplary embodiment, each ad channel includes ads belonging to a same category or a same sub-category, as illustrated in FIG. 3C. The category or sub-category information is known by interface device 160 to assist interface device 160 in selecting an ad channel suitable for a user. According to an exemplary embodiment, ad channels may also include user information. For example, assume interface device 160 is used by multiple users. According to such circumstances, some ad channels may be dedicated to one user and other ad channels may be dedicated to another user. Additionally, an ad channel may include a combination of information, such as, category, sub-category and/or user information.

Figure 3D:
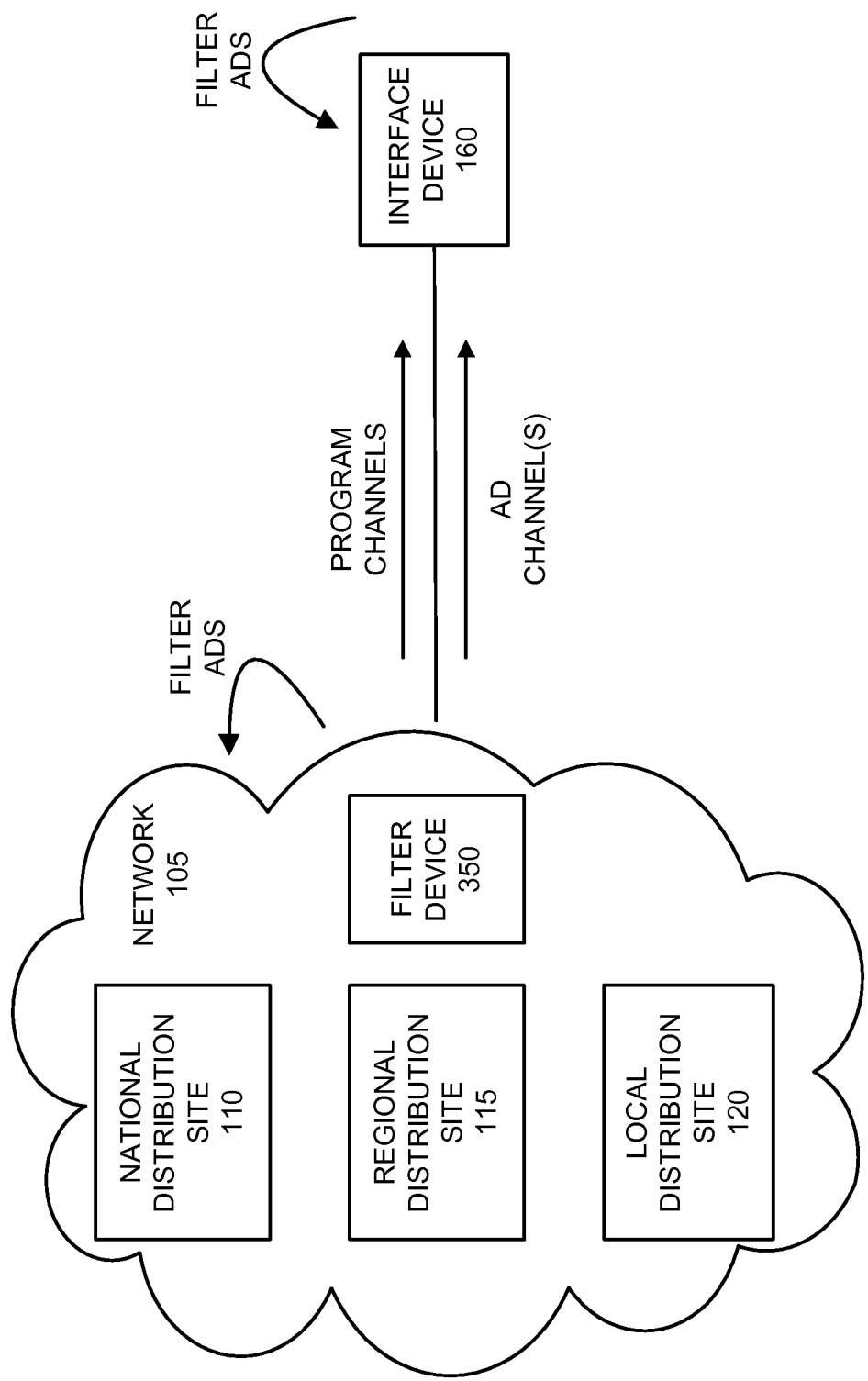
FIG. 3D is a diagram illustrating an exemplary process for filtering ads.

As previously described, according to an exemplary embodiment, a filtering system is used to filter ads for purposes of targeting ads to a user(s). FIG. 3D is a diagram illustrating an exemplary process of filtering ads. As illustrated, network 105 includes a filter device 350 that may be associated with at least one of distribution sites 110, 115, or 120. Filter device 350 filters ads so irrelevant ads are not transmitted over an ad channel. In this way, it is more probable that relevant ads will be transmitted over the ad channel more frequently and can be shown to the user.

According to an exemplary embodiment, filter device 350 filters ads based on user data collected from numerous interface devices 160. The collected data includes viewing patterns associated with users and demographic information. Based on a data analysis of the data collected, network 105 (e.g., filter device 350) ranks (e.g., provides ratings to) the ads based on locales to which the ads are to be provided. For example, each locale or zone may have a locale profile that includes statistics and demographic information pertaining to the users of that geographic region. As illustrated, network 105 transmits ad channel(s), which carries ads having passed the filtering process of filter device 350, to interface device 160.

According to an exemplary embodiment, interface device 160 filters ads received on the ad channel(s). According to an exemplary embodiment, the ads are filtered based on a user profile. The user profile may include information previously described. Interface device 160 selects ads having a likelihood of interest to a user pertaining to the user profile. According to such an embodiment, the load of filtering ads is shared between the distribution system (e.g., network 105) and the receiving device (e.g., interface device 160).

FIG. 4 is a diagram illustrating exemplary components of a device 400 that may correspond to one or more of the devices in environment 100. As illustrated, according to an exemplary embodiment, device 400 may include a processor 405, memory/storage 410 including software 415, a communication interface 420, an input 425, and an output 430. According to other embodiments, device 400 may include fewer components, additional components, different components, and/or a different arrangement of components than those illustrated in FIG. 4 and described herein. These exemplary components may be used to implement previously described components, such as, demodulator 340, ad manager 342, tuner 346, etc.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or software (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides one or multiple functions or processes. Software 415 may include various forms of firmware (e.g., microcode, data, machine code, etc.). According to an exemplary embodiment, target ad device 205, filter device 350, and/or receiving device (e.g., interface device 160, etc.) may include software 415 to provide a function(s) and/or a process(es) described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform a process(es) and/or a function (s), as described herein, in response to processor 405 executing instructions (e.g., software 415) stored by memory/storage 410. By way of example, instructions may be read into memory/storage 410 from another memory/storage 410 or from another device via communication interface 420. The instructions stored by memory/storage 410 may cause processor 405 to perform a process or a function, as described herein. Alternatively, for example, according to other implementations, device 400 may perform a process or a function based on the execution of hardware (processor 405, etc.), the execution of firmware with hardware, or the execution of software and firmware with hardware.

Figure 5:
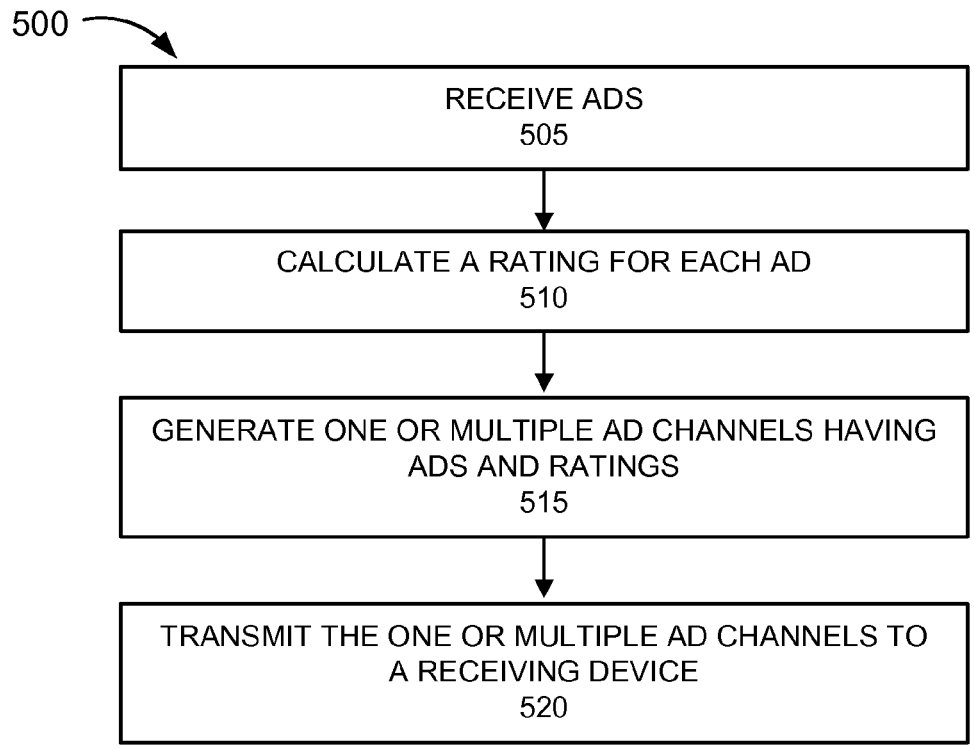
FIG. 5 is a flow diagram illustrating an exemplary process for targeted advertising.

FIG. 5 is a flow diagram illustrating an exemplary process 500 for targeted advertising. According to an exemplary embodiment, one or more steps of process 500 are performed by a device (e.g., target ad device 205) of a distribution system (e.g., network 105). For example, processor 405 executes software 415 to perform the one or more steps described.

Referring to FIG. 5, in block 505, ads are received. For example, as previously described, a device of at least one of distribution sites 110, 115, or 120 receives ads from ad provider(s). For example, target ad device 205 receives the ads from the ad provider(s). According to other embodiments, some other device (e.g., a device in a content center) receives the ads and provides the ads to target ad device 205.

In block 510, a rating for each ad is calculated (block 510). For example, as previously described, target ad device 205 calculates ratings for ads based on an ad profile and a user profile. According to an exemplary embodiment, a rating of an ad represents a likelihood of interest of a user for the ad. According to an exemplary implementation, the ratings may take the form of a number. According to other implementations, the ratings may take the form of some other suitable designators.

In block 515, one or multiple ad channels having ads and ratings are generated. For example, as previously described, one or multiple ad channels are generated to carry the ads their assigned ratings. According to an exemplary embodiment, an ad channel may be implemented as ad channel 320 in which a series of ads 325 and ratings 330 are sequentially included. According to other embodiments, the ad channel may include guard bands or other spacing between a rating/ad pair. Additionally, according to other embodiments, an ad channel may include other types of information. By way of example, category and/or sub-category information may be included with each ad. Additionally, or alternatively, an ad channel may include user information to indicate a particular user or users. According to an exemplary embodiment, target ad device 205 may generate the one or multiple ad channels. According to other embodiments, some other device (e.g., a media server, etc.) may receive the ratings calculated by target ad device 205 and generate the one or multiple ad channels.

In block 520, the one or multiple ad channels are transmitted to a receiving device. For example, as previously described, the one or multiple ad channels are transmitted to an interface device 160 or some other user device (e.g., television 155, remote device 165) or combination thereof.

Although FIG. 5 illustrates an exemplary process 500 for targeted advertising, according to other embodiments, process 500 may include additional operations, fewer operations, and/or different operations than those illustrated in FIG. 5 and described herein.

Figure 6:
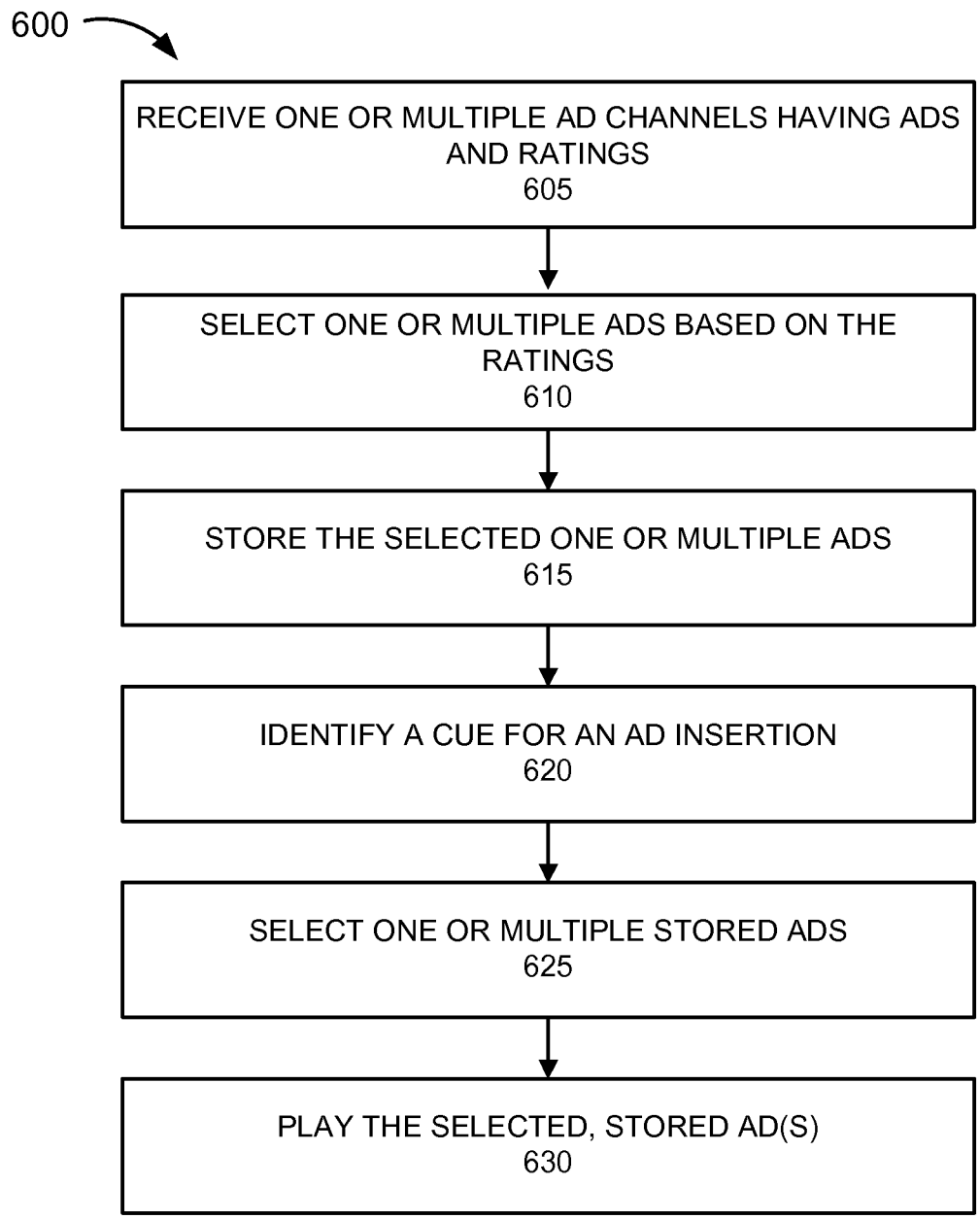
FIG. 6 is a flow diagram illustrating another exemplary process for targeted advertising.

FIG. 6 is a flow diagram illustrating another exemplary process 600 for targeted advertising. According to an exemplary embodiment, one or more steps of process 600 are performed by a receiving device (e.g., interface device 160, a remote device 165, a computer, a user device, etc.). For example, processor 405 executes software 415 to perform the one or more steps described.

Referring to FIG. 6, in block 605, one or multiple ad channels having ads and ratings are received. For example, as previously described, a receiving device, such as, interface device 160 receives one or multiple ad channels. According to an exemplary embodiment, the receiving device simultaneously receives program channel(s) and ad channel(s) from a distribution system (e.g., network 105). According to an exemplary embodiment, an ad channels includes ads and ratings, as previously described. According to other embodiments, an ad channel may include other information, as previously described. According to an exemplary embodiment, a rating of an ad represents a likelihood of interest of a user for the ad.

In block 610, one or multiple ads are selected based on the ratings. For example, as previously described, the receiving device (e.g., interface device 160, etc.) selects ads to store based on the ratings associated with the ads. For example, according to an exemplary implementation, the ratings may take the form of a numerical value that allows for comparison to other ratings. According to such an implementation, the receiving device may select ads having a value above a threshold value. According to another implementation, the receiving device may store a particular number of ads. According to such an implementation, the receiving device compares an incoming rating of an ad with the one or more other ratings (e.g., a lowest rating of a stored ad, etc.). The receiving device would then replace, for example, the ad having the lowest rating with the incoming ad having a higher rating. According to yet another implementation, the receiving device may store ads up to a particular storage capacity. According to an exemplary embodiment, the receiving device may select ads based on other information, such as, for example, category information, sub-category information, program currently being viewed by the user, and/or user information.

In block 615, the selected one or multiple ads are stored. For example, as previously described, the receiving device stores the selected one or multiple ads in memory/storage 410.

In block 620, a cue for an ad insertion is identified. For example, as previously described, the receiving device identifies an ad insertion (e.g., ad insertion 310) based on a cue included in a program signal (e.g., program channel 300). By way of example, the cue is a cue tone to indicate to the receiving device that an ad is to be played. According to other implementations, the cue may be some other type of audio and/or visual cue included in the program signal.

In block 625, one or multiple stored ads are selected. For example, as previously described, the receiving device selects one or multiple ads based on the identification of the cue. According to an exemplary embodiment, the receiving device selects the highest rated ad(s) that are stored. According to an exemplary embodiment, the receiving device selects stored ad(s) based on the duration of each stored ad relative to the duration of the ad insertion. According to an exemplary embodiment, the receiving device selects stored ad(s) based on the currently playing program. For example, if the program playing is a comedy, the receiving device may give preference to ad(s) that are of a comedic category.

In block 630, the selected, stored ad(s) are played. For example, as previously described, the receiving device plays the selected stored ad(s).

Although FIG. 6 illustrates an exemplary process 600 for targeted advertising, according to other embodiments, process 600 may include additional operations, fewer operations, and/or different operations than those illustrated in FIG. 6 and described herein. For example, the receiving device may continue to store ad(s) that have already played.

Figure 7A:
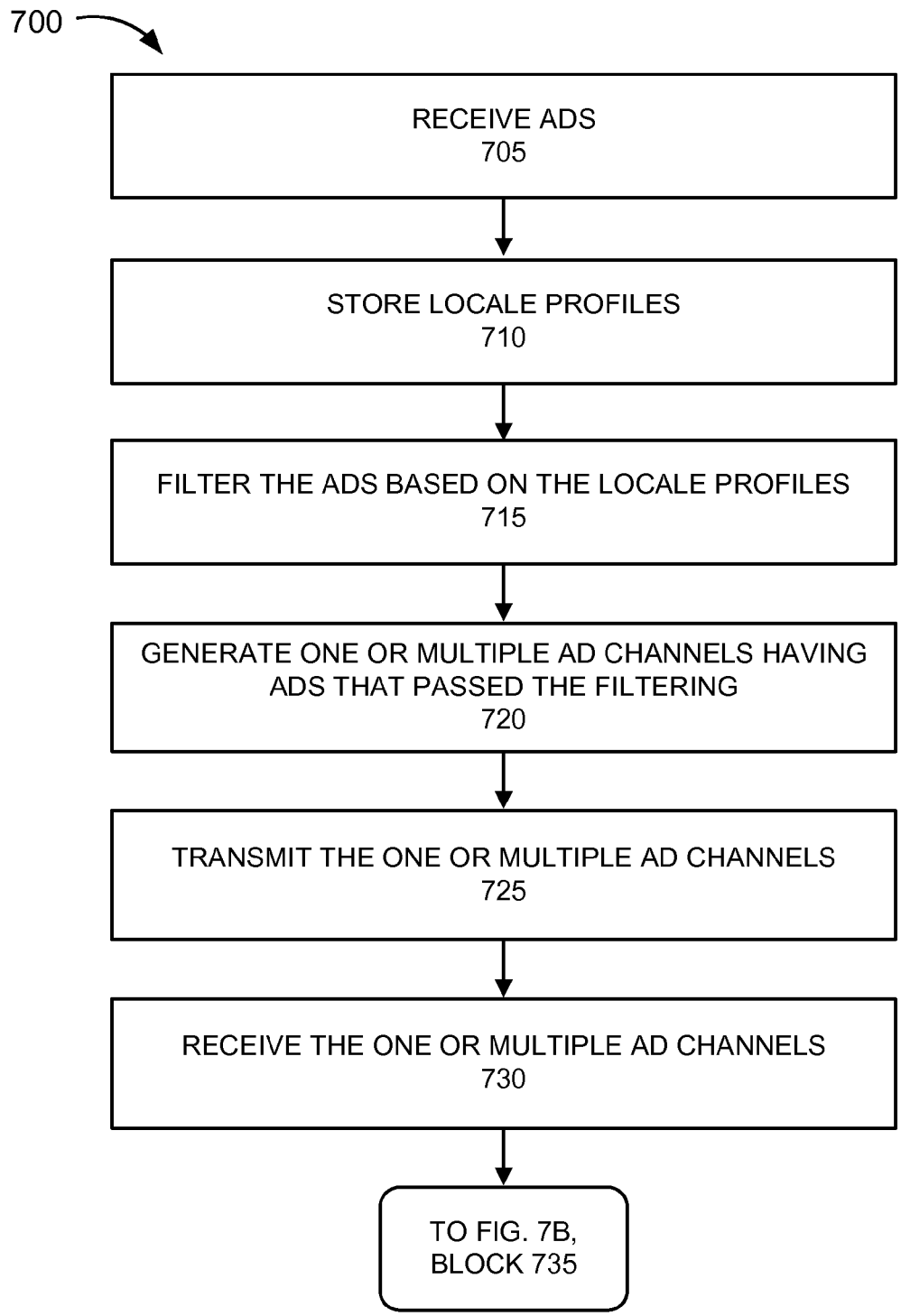
FIGS. 7A and 7B are flow diagrams illustrating yet another exemplary process for targeted advertising.
Figure 7B:
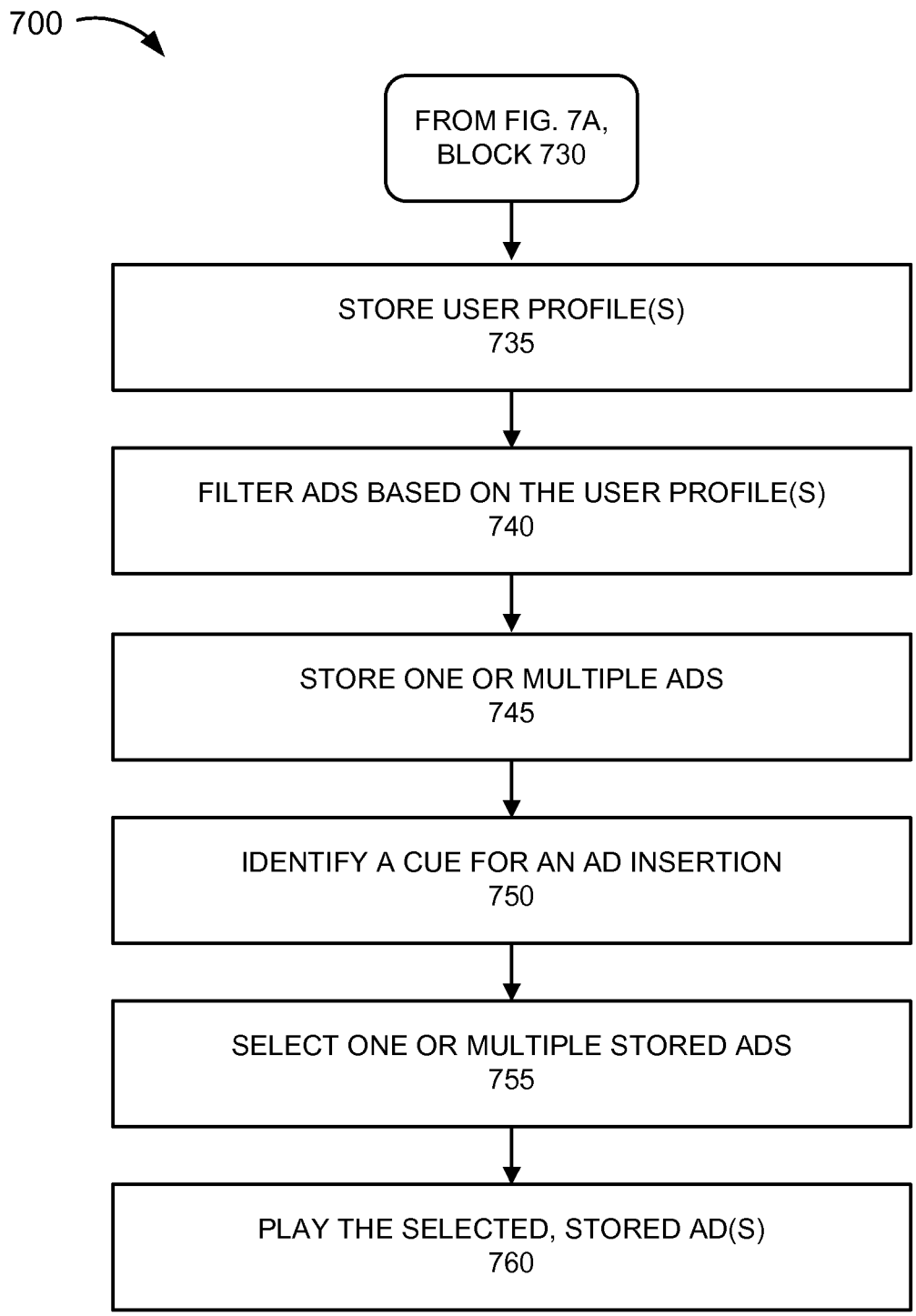

FIGS. 7A and 7B are flow diagrams illustrating yet another exemplary process 700 for targeted advertising. According to an exemplary embodiment, one or more steps of process 700 are performed by a device (e.g., filter device 350) of a distribution system (e.g., network 105) and one or more steps of process 700 are performed by a receiving device (e.g., interface device 160, a remote device 165, a computer, a user device, etc.). For example, processor 405 executes software 415 to perform the one or more steps described.

Referring to FIG. 7A, in block 705, ads are received. For example, as previously described, a device of at least one of distribution sites 110, 115, or 120 receives ads from ad provider(s). According to an exemplary embodiment, filter device 350 may receive the ads from the ad provider(s). According to other embodiments, some other device (e.g., a device in a content center) receives the ads and provides the ads to filter device 350.

In block 710, locale profiles are stored. For example, filter device 350 or another device (e.g., a database server, etc.) stores locale profiles. According to an exemplary embodiment, a locale profile includes viewing patterns and demographic information pertaining to users within a particular geographic region.

In block 715, ads are filtered based on the locale profiles. For example, as previously described, filter device 350 filters ads based on the locale profiles. By way of example, filter device 350 compares a locale profile to information associated with ads. The information may include an ad profile, as previously described. Based on the comparison, filter device 350 determines whether an ad is suitable for the users of the geographic region pertaining to the locale profile.

In block 720, one or multiple ad channels having ads that passed the filtering are generated. For example, filter device 350 or some other device (e.g., a media server, a target ad device 305, etc.) generates the one or multiple ad channels. According to an exemplary embodiment, an ad channel may include only the ads. According to another exemplary embodiment, an ad channel may include other information (e.g., ratings pertaining to the users of the geographic region versus a particular user), a category and/or sub-category information, etc., as previously described.

In block 725, the one or multiple ad channels are transmitted. For example, as previously described, the one or multiple ad channels are transmitted to a receiving device (e.g., interface device 160, etc.).

In block 730, the one or multiple ad channels are received. For example, as previously described, the receiving device receives one or multiple ad channels.

Referring to FIG. 7B, in block 735, user profile(s) are stored. For example, the receiving device stores user profiles. For example, a user profile may include demographic data and viewership data, as previously described.

In block 740, ads are filtered based on the user profile(s). For example, the receiving device filters the ads received via the one or multiple ad devices based on the user profiles.

In blocks 745-760, process 700 is similar to the steps previously described in blocks 615-630 of FIG. 6. For example, the receiving device selects ads having a likelihood of interest of a user, stores the ads, identifies a cue for an ad insertion, selects one or multiple stored ads, and plays the selected, stored ads.

Although FIGS. 7A and 7B illustrate an exemplary process 700 for targeted advertising, according to other embodiments, process 700 may include additional operations, fewer operations, and/or different operations than those illustrated in FIGS. 7A and 7B, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5, 6, 7A and 7B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing ads with ratings pertaining to the ads, wherein the ads are provisioned for insertion between programs of a television service, and wherein each rating indicates a likelihood of interest of a user for each ad;
   storing ad profiles of the ads, wherein the ad profiles each include a locale descriptor that indicates a geographic area applicable to an ad and a popularity index that indicates a degree of popularity of a thing advertised in the ad in relation to the locale descriptor;
   storing a user profile of the user that includes demographic data, viewership data, and locale data pertaining to the user;
   storing reinforcement values pertaining to the ads, wherein the ads were previously provided to the user, wherein each reinforcement value indicates the user's interest in one of the previously provided ads or the user's lack of interest in one of the previously provided ads based on a tracking of the user's viewing of the ad when the ad was to be viewed;
   calculating replacement ratings for the ads based on the ad profiles, the user profile, and the reinforcement values, wherein each replacement rating indicates a likelihood of interest to the user for an ad previously provided to the user;
   generating one or more ad channels including the ads and the replacement ratings; and
   transmitting the one or more ad channels to a receiving device associated with the user.

2. The method of claim 1, wherein the locale descriptor indicates a zip code, a state, or a city, and wherein the reinforcement values are derived based on a length of time the user views the ads previously provided to the user.

3. The method of claim 2, wherein the ad profiles include at least one of a category of an ad or a sub-category of an ad, and wherein the degree of popularity of the thing advertised is measured based on market share brand recognition, wherein the one or more ad channels include user information to indicate the user.

4. The method of claim 1, further comprising:
   filtering the ads based on the locale descriptor; and wherein the generating comprises:
   generating the one or more ad channels based on the filtering.

5. The method of claim 1, further comprising:
   identifying the user associated with the receiving device based on an identifier of the receiving device; and
   calculating the replacement rating for each ad based on the identified user.

6. A method comprising:
   receiving an ad channel including ads and ratings pertaining to the ads, wherein each rating indicates a likelihood of interest to a user for an ad;
   selecting the ads based on the ratings;
   storing the ads and the ratings;
   identifying a cue for an ad insertion;
   selecting, in response to the identifying, the ads stored;
   playing the ads selected during an ad insertion time period;
   tracking a length of time the user views the ads during the playing of the ads;
   generating reinforcement values, which indicate the user's interest in the played ads or the user's lack of interest in the played ads, based on the tracking; and
   generating replacement ratings for the ads based on the reinforcement values, a user profile associated with the user that includes demographic data, viewership data and locale data, and ad profiles pertaining to the ads that include a category of each ad and a locale descriptor that indicates a geographic area applicable to the ad.

7. The method of claim 6, further comprising:
   selecting a default ad channel when an identity of the user is not known; and
   selecting another ad channel when the identity of the user is known.

8. The method of claim 6, wherein the selecting further comprises:
   selecting the ads based on a program playing before the cue.

9. The method of claim 6, wherein the receiving comprises:
   receiving, by a set top box, the ad channel when a television connected to the set top box is turned off.

10. The method of claim 6, further comprising:
    storing one or more user profiles pertaining to one or more users associated with a receiving device that receives the ad channel, wherein the one or more user profiles include the user profile associated with the user; and
    filtering the ads included in the ad channel based on the one or more user profiles.

11. A network device comprising:
    a communication interface;
    one or more memories that store instructions; and
    one or more processors to execute the instructions to:
    receive ads via the communication interface;
    store the ads with ratings pertaining to the ads, wherein the ads are provisioned for insertion between programs of a television service;
    store ad profiles of the ads, wherein the ad profiles each include a locale descriptor that indicates a geographic area applicable to an ad and a popularity index that indicates a degree of popularity of a thing advertised in the ad in relation to the locale descriptor;

store a user profile of a user that includes demographic data, viewership data, and locale data pertaining to the user;

store reinforcement values pertaining to the ads, wherein the ads were previously provided to the user, wherein each reinforcement value indicates the user's interest in one of the previously provided ads or the user's lack of interest in one of the previously provided ads based on a tracking of the user's viewing of the ad when the ad was to be viewed;

calculate replacement ratings for the ads based on the ad profiles, the user profile, and the reinforcement values, wherein each replacement rating indicates a likelihood of interest to the user for an ad previously provided to the user;

generate one or more ad channels having the ads and the replacement ratings; and transmit the one or more ad channels to a receiving device associated with the user.

12. The network device of claim 11, wherein the locale descriptor indicates a zip code, a state, or a city.

13. The network device of claim 11, wherein the one or more processors further execute the instructions to:
filter the ads based on the locale descriptor, and wherein when generating, the one or more processors further execute the instructions to:
generate the one or more ad channels based on the filtered ads.

14. The network device of claim 13, wherein the one or more processors further execute the instructions to:
identify the user associated with the receiving device based on an identifier associated with the receiving device; and wherein when calculating, the one or more processors further execute the instructions to:
calculate the replacement rating for each ad based on the identified user.

15. The network device of claim 11, wherein the one or more processors further execute the instructions to:
receive, via the communication interface, the reinforcement values pertaining to the ads previously transmitted to the user to re-calculate ratings associated with the ads.

16. A device comprising:
a communication interface;
one or more memories that store instructions; and
one or more processors to execute the instructions to:
receive, via the communication interface, an ad channel including ads and ratings pertaining to the ads, wherein each rating indicates a likelihood of interest to a user for an ad;
select the ads based on the ratings;
store the one or more ads and the one or more ratings;
identify a cue for an ad insertion;
select, in response to an identification of the cue, the ads stored;
play the ads selected during an ad insertion time period;
track a length of time the user views the ads during the playing of the ads;
generate reinforcement values, which indicate the user's interest in the played ads or the user's lack of interest in the played ads, based on a tracking of the user's viewing; and
generate replacement ratings for the ads based on the reinforcement values, a user profile associated with the user that includes demographic data, viewership data and locale data, and ad profiles pertaining to the ads that include a category of each ad and a locale descriptor that indicates a geographic area applicable to the ad.

17. The device of claim 16, wherein when receiving, the one or more processors further execute instructions to:
select a default ad channel when an identity of the user is not known; and
select another ad channel when the identity of the user is known.

18. The device of claim 16, wherein when selecting, the one or more processors further execute instructions to:
select the ads based on a program playing before the cue.

19. The device of claim 18, wherein the ad channel is associated with at least one of an ad category, an ad sub-category, or the user, and wherein when selecting, the one or more processors further execute instructions to:
select the ads based on at least one of the ad category, the ad sub-category, or the user.

20. The device of claim 16, wherein the one or more processors further execute instructions to:
store one or more user profiles pertaining to one or more users associated with a receiving device that receives the ad channel, wherein the one or more user profiles include the user profile associated with the user; and
filter the ads included in the ad channel based on the one or more user profiles.

21. A non-transitory readable medium storing instructions executable by a processor of a computational device, which when executed cause the computational device to:
receive one or more ad channels having ads and ratings pertaining to the ads, wherein each rating indicates a likelihood of interest to a user for an ad;
select the ads based on the ratings;
store the ads and the ratings;
identify a cue for an ad insertion in relation to a program;
select, in response to an identification of the cue, the ads stored to perform the ad insertion;
play the ads selected during an ad insertion time period;
track a length of time the user views the ads during the playing of the ads;
generate reinforcement values, which indicate the user's interest in the played ads or the user's lack of interest in the played ads, based on a tracking of the user's viewing; and
generate replacement ratings for the ads based on the reinforcement values, a user profile associated with the user that includes demographic data, viewership data and locale data, and ad profiles pertaining to the ads that include a category of each ad and a locale descriptor that indicates a geographic area applicable to the ad.

22. The non-transitory readable medium of claim 21, further storing instructions executable by the processor of the computational device, which when executed cause the computational device to:
store one or more user profiles pertaining to one or more users associated with the computational device, wherein the one or more user profiles include the user profile associated with the user; and
filter ads included in the one or more ad channels based on the one or more user profiles.

* * * * *